United States Patent [19]
Itoh et al.

[11] Patent Number: 5,343,415
[45] Date of Patent: Aug. 30, 1994

[54] LOGARITHMIC POLAR COORDINATE TRANSFORMING METHOD, VISION RECOGNIZING METHOD, AND OPTICAL INFORMATION PROCESSING APPARATUS

[75] Inventors: Masami Itoh, Takarazuka; Kanji Nishii, Osaka; Hiroyuki Kawamura, Katano; Atsushi Fukui, Hirakata, all of Japan

[73] Assignee: Matsushita Electric Industrial Co., Ltd., Osaka, Japan

[21] Appl. No.: 962,655

[22] Filed: Oct. 19, 1992

Related U.S. Application Data

[63] Continuation-in-part of Ser. No. 750,486, Aug. 27, 1991, abandoned.

[30] Foreign Application Priority Data

Aug. 31, 1990 [JP] Japan .................. 2-231708

[51] Int. Cl.$^5$ .......................... G06F 7/38; G06K 9/36
[52] U.S. Cl. ........................ 364/725; 382/43
[58] Field of Search ............... 364/725, 726, 822, 815, 364/413.2; 395/140; 382/31, 42, 43

[56] References Cited

U.S. PATENT DOCUMENTS

| | | | |
|---|---|---|---|
| 4,084,255 | 4/1978 | Casasent et al. | 364/822 |
| 5,050,220 | 9/1991 | Marsh et al. | 382/43 |
| 5,239,595 | 8/1993 | Takemura et al. | 382/31 |

FOREIGN PATENT DOCUMENTS 2-132412  5/1990  Japan .
3-257419  11/1990  Japan .
4-39690   2/1992  Japan .

OTHER PUBLICATIONS

Patent Abstracts of Japan, vol. 8, No. 171 (P-293) Oct. 8, 1982 & JP-A-59 065 823 (Ricoh KK) Apr. 14, 1984 "abstract".
Patent Abstracts of Japan, vol. 5, No. 77 (P-62) Aug. 2, 1979 & JP-A-56 024 310 (Ricoh Co. Ltd.) Mar. 7, 1981 "abstract".
"Real-time deformation invariant optical pattern recognition using coordinate transformations", Casasent et al., Applied Optics, vol. 26, No. 5, Mar. 1, 1987, pp. 938-942.

Primary Examiner—Long T. Nguyen
Attorney, Agent, or Firm—Wenderoth, Lind & Ponack

[57] ABSTRACT

A vision recognizing method includes a logarithmic polar coordinate transforming method including the steps of storing an input image f1(x, y); optically generating complex amplitude information f1(x, y)A(x, y)T(x, y) by multiplying the information of the input image by the product of phase information A(x, y) for performing a logarithmic polar coordinate transformation and amplitude information T(x, y), an amplitude of which changes according to distance between each point composing the amplitude information and origin of logarithmic polar coordinate; and Fourier-transforming the complex amplitude information f1(x, y)A(x, y)T(x, y). An optical information processing apparatus is used to carry out the method and includes a combination of lenses and liquid crystal displays.

5 Claims, 10 Drawing Sheets

, 1

LOGARITHMIC POLAR COORDINATE TRANSFORMING METHOD, VISION RECOGNIZING METHOD, AND OPTICAL INFORMATION PROCESSING APPARATUS

CROSS-REFERENCE TO RELATED APPLICATIONS

This application is a continuation-in-part application of abandoned U.S. patent application Ser. No. 750,486, filed Aug. 27, 1991, entitled "LOGARITHMIC POLAR COORDINATE TRANSFORMING METHOD, VISION RECOGNIZING METHOD, AND OPTICAL INFORMATION PROCESSING APPARATUS".

BACKGROUND OF THE INVENTION

The present invention relates to a method for performing a logarithmic polar coordinate transformation with a high accuracy by using an optical information processing apparatus and a vision recognizing method to be carried out by using the above method.

As a conventional art, Japanese Laid-Open Patent Publication No. 2-57118 has been proposed by the present inventor(s) to perform a logarithmic polar coordinate transformation by using an optical information processing apparatus.

FIG. 9 shows the fundamental construction of the conventional optical information processing apparatus. Reference numeral 1 denotes a television camera (hereinafter referred to as TV camera) capable of varying zoom ratio; 2 denotes a first liquid crystal display for displaying an image picked up by the TV camera 1; 3 denotes a laser diode; 4 denotes a collimator lens which makes beams emitted by the laser diode 3 parallel with each other; 6 denotes a second liquid crystal display adjacent to the first liquid crystal display 2; and 7 denotes a lens. The second liquid crystal display 6 is disposed on the first focal plane of the lens 7. Reference numeral 8 denotes a photoelectric converting device which is disposed on the second focal plane of the lens 7. Reference numeral 309 denotes a read only memory (ROM) onto which data of a computer-generated hologram calculated beforehand with each pixel of the second liquid crystal display 6 being a sampling point is written, i.e., an applied voltage corresponding to the transmission coefficient of each pixel is written to perform a logarithmic polar coordinate transformation of an input image.

The operation of the conventional art optical information processing apparatus constructed as above is described. First, when an object is picked up by the TV camera 1, the image thereof is displayed on the first liquid crystal display 2. The first liquid crystal display 2 is irradiated by coherent beams emitted by the laser diode 3 and made to be parallel with each other by the collimator lens 4. At this time, the phase information of a phase filter for optically transforming the input image in logarithmic polar coordinate is displayed on the second liquid crystal display 6 in the form of a computer-generated hologram by spatially modulating the transmission coefficient of each pixel of the second crystal display 6 with data written onto the ROM 309 being an input signal to the second liquid crystal display 6. For example, the method for generating the phase information of a phase filter is described in "Real-time deformation invariant optical pattern recognition using coordinate transformations" written by David Casasent et al., APPLIED OPTICS, vol. 26, No. 5, March, 1, 1987.

Accordingly, the input image displayed on the first liquid crystal display 2 and the phase information for optically transforming the input image in logarithmic polar coordinate are superimposed on each other on the second liquid crystal display 6. Since the second liquid crystal display 6 is disposed on the first focal plane of the lens 7, the optical product of the input image of the object and the phase information for optically transforming the input image in the logarithmic polar coordinate is optically Fourier-transformed by the lens 7, and an image obtained by transforming the input image of the object in the logarithmic polar coordinate is detected by the photoelectric converting device 8.

FIG. 10(b) shows the result of a computer simulation of a doughnut-shaped input image shown in FIG. 10(a) performed by the optical information processing apparatus having the above-described construction. The size of each dot of FIG. 10(b) shows the intensity of an image obtained by transforming the input image in the logarithmic polar coordinate. The region enclosed by a rectangle indicates a strict solution.

In recognizing an object which flows on a production line of, for example, a factory, the object can be accurately recognized by performing a pattern matching of the object image and a reference pattern by additionally using an optical correlator in carrying out a logarithmic polar coordinate transformation method which uses the above-described conventional optical information processing apparatus. This is because the value of the object image relative to that of the reference pattern does not change even though the object makes a scale change or rotates.

As described above, a logarithmic polar coordinate transformation has invariability for the scale change or the rotational movement of the object, but does not have invariability for the parallel movement thereof. Therefore, the object cannot be accurately recognized when the object makes a parallel movement. Regarding this disadvantage, it is known that the value of the object image relative to that of the reference pattern is not changed by performing a pattern matching by Fourier-transforming an input image and then transforming the Fourier-transformed input image in logarithmic polar coordinate even though the object makes a scale change, a rotational movement or a parallel movement. Thus, the object can be accurately recognized.

However, according to the construction as described above, the intensity of the coordinate-transformed image becomes lower as approaching the origin of logarithmic polar coordinate and higher in being far from the origin thereof as shown in FIG. 10(b). That is, an intensity gradient is generated in the coordinate-transformed image in the radial direction thereof and therefore, the coordinate transformation cannot be made accurately.

In addition, when the above construction is used as the pre-processing of the pattern matching of the object image, a vision cannot be recognized accurately because the coordinate transformation cannot be made accurately.

SUMMARY OF THE INVENTION

It is an object of the present invention to prevent a logarithmic polar coordinate-transformed image from generating an intensity gradient in the radial direction thereof so as to perform a logarithmic polar coordinate transformation and a vision recognition accurately.

In accomplishing these and other objects, according to one aspect of the present invention, there is provided a logarithmic polar coordinate transforming method comprising the steps of:

storing an input image f1(x, y);

generating complex amplitude information f1(x, y)A(x, y)T(x, y) by multiplying the input image by a product of phase information A(x, y) for performing a logarithmic polar coordinate transformation and amplitude information T(x, y), an amplitude of which changes according to a distance between each point composing the amplitude information and an origin of logarithmic polar coordinate; and Fourier-transforming the complex amplitude information f1(x, y)A(x, y)T(x, y).

Owing to the above means, the present invention is capable of preventing a logarithmic polar coordinate-transformed image from generating an intensity gradient in the radial direction thereof.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
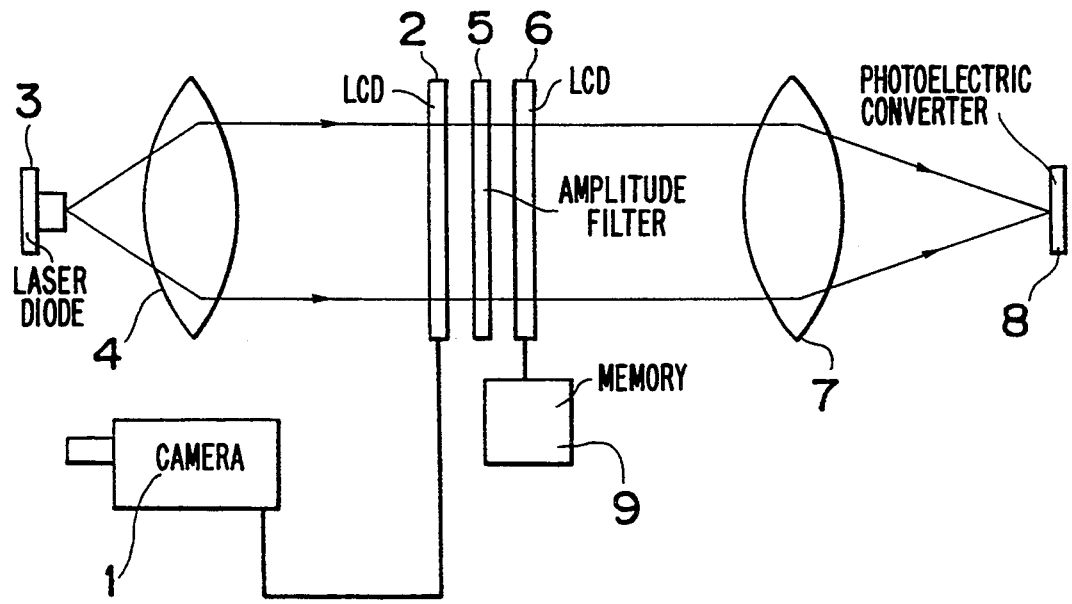
FIG. 1 is a fundamental construction view showing an optical information processing apparatus for performing a logarithmic polar coordinate transformation according to a first embodiment of the present invention.

A logarithmic polar coordinate transforming method, a vision recognizing method, and an optical information processing apparatus according to the present invention are described below with reference to the drawings. FIG. 1 shows the fundamental construction of the optical information processing apparatus for carrying out the logarithmic polar coordinate transforming method according to a first embodiment of the present invention. In FIG. 1, the same parts as those of the conventional art are denoted by the same reference numerals and the descriptions thereof are omitted. The first embodiment of the present invention is essentially different from the conventional art in that an amplitude filter 5 is provided between the first liquid crystal display 2 and the second liquid crystal display 6.

The amplitude filter 5 is composed of, for example, an ND filter (neutral density filter) which modulates the amplitude distribution T(x,y) of a beam transmitting therethrough to $T(x,y) = r0/(x^2+y^2)^{1/2}$. In this equation, "r0" is a constant.

Alternatively, the amplitude filter 5 may be composed of an ND filter (neutral density filter), the transmission coefficient of which changes by changing the thickness of an evaporating film formed on a glass substrate, according to the distance between each point composing the amplitude information (T(x, y)) and an origin of logarithmic polar coordinate. In other words, for example, the transmission coefficient of the filter in each point composing the amplitude information (T(x, y)) is expressed by a reciprocal of the distance between the point and the center of the amplitude information (T(x, y)) when the center of the amplitude information (T(x, y)) coincides with the center of the filter.

The operation of the optical information processing apparatus constructed as above is described below. First, when an object is picked up by the TV camera 1, the information f1(x, y) of the image thereof is displayed on the first liquid crystal display 2. The first liquid crystal display 2 is irradiated by coherent beams emitted by the laser diode 3 and made to be parallel with each other by the collimator lens 4.

At this time, in response to as an input signal data written in the memory 9, the transmission coefficient of each pixel of the second liquid crystal display 6 is spatially modulated and as a result, phase information, expressed below, for optically transforming the input image in logarithmic polar coordinate is displayed thereon in the form of a computer-generated hologram:

$$A(x, y) = \exp[2\pi a i/(f_L \lambda)\{x \ln(x^2+y^2)^{1/2} - y\tan^{-1}(y/x) - x\}]$$

In the above equation, "$f_L$" is the focal length of the lens 7; "$\lambda$" is the wavelength of the laser diode 3; and "a" is scale factor.

Accordingly, the information f1(x, y) of the input image of the object displayed on the first liquid crystal display 2, the amplitude information T(x, y) of the amplitude filter 5, and the phase information A(x, y) thereof are superimposed on each other on the second liquid crystal display 6, and thus complex amplitude information f1(x, y)A(x, y)T(x, y) is obtained.

Since the second liquid crystal display 6 is disposed on the front focal plane of the lens 7, the complex amplitude information f1(x, y)A(x, y)T(x, y) is optically Fourier-transformed by the lens 7, and an image obtained by transforming the information f1(x, y) of the input image of the object in logarithmic polar coordinate is detected by the photoelectric converting device 8.

Figure 10A:
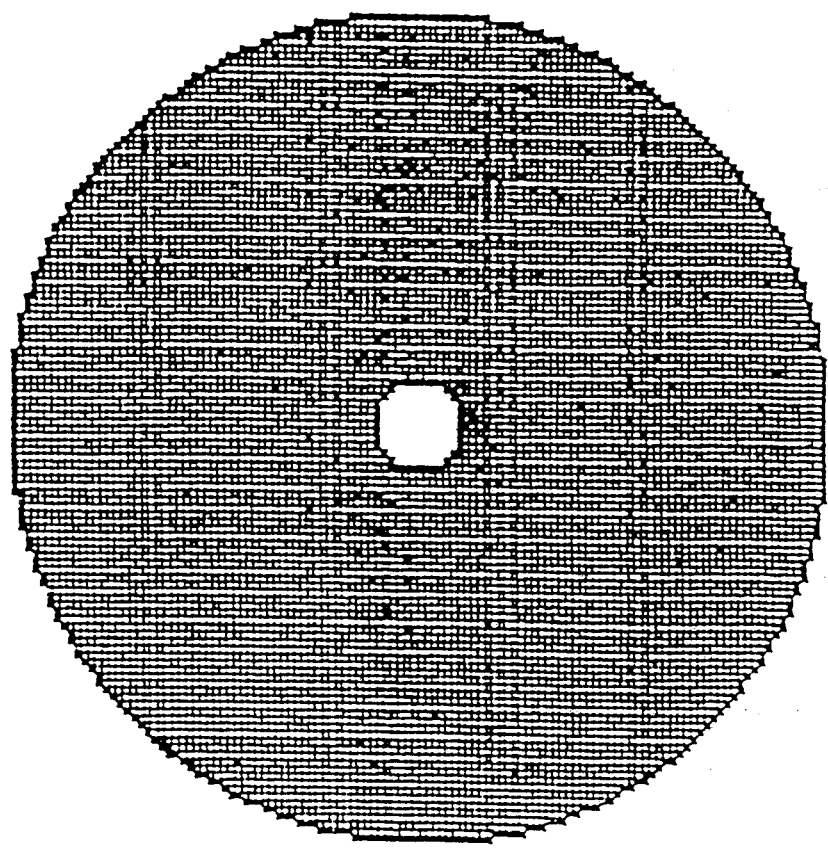
FIG. 10(a) shows a input image.
Figure 10B:
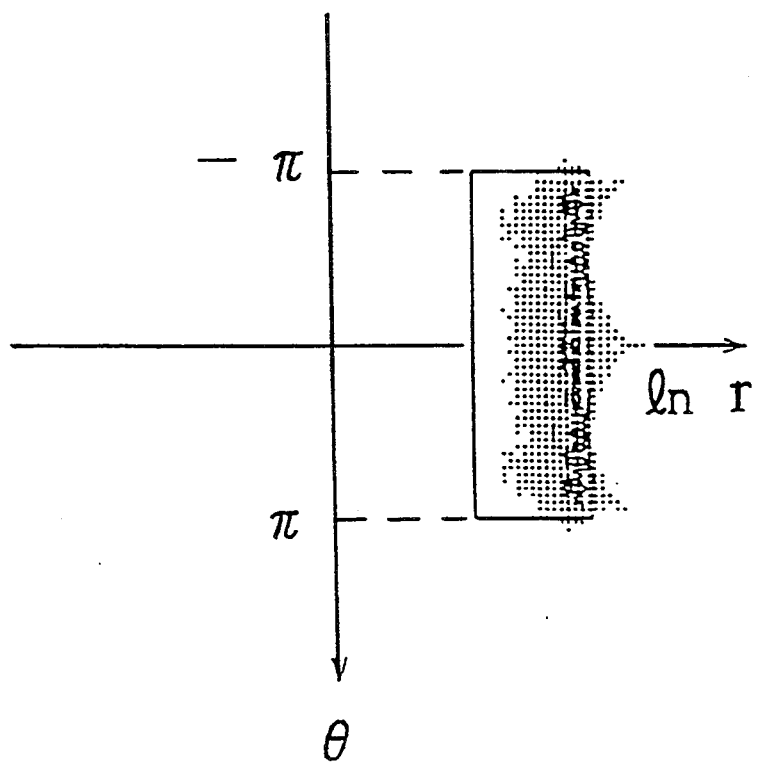
FIG. 10(b) shows the result of a simulation obtained by the conventional optical information processing apparatus.
Figure 10C:
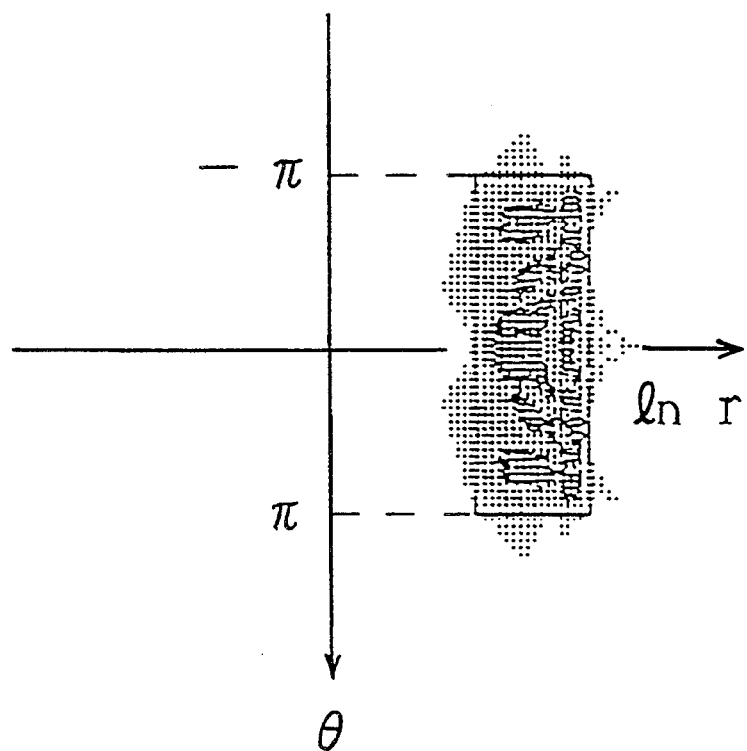
FIG. 10(c) shows the result of a simulation obtained by the optical information processing apparatus according to the first embodiment of the present invention.

FIG. 10(c) shows the result of a computer simulation of a doughnut-shaped input image shown in FIG. 10(a) by using the optical information processing apparatus having the above-described construction. The size of each dot of FIG. 10(c) shows the intensity of an image obtained by transforming the input image in logarithmic polar coordinate. The region enclosed by a rectangle indicates a strict solution. As shown in FIGS. 10(b) and 10(c), the image shown in FIG. 10(c) is stricter than that of FIG. 10(b).

As described above, according to this embodiment, the amplitude filter 5, the transmission coefficient of which changes according to the distance between each point composing the amplitude information and the origin of logarithmic polar coordinate is used to remove the generation of the intensity gradient of the coordinate-transformed image in the radial direction thereof as shown in FIG. 10(c). Thus, a logarithmic polar coordinate transformation can be performed precisely.

According to this embodiment, the amplitude filter 5 is used to add the amplitude information T(x, y), the amplitude of which changes according to the distance between each point composing the amplitude information T(x, y) and the origin of logarithmic polar coordinate, but instead, a computer-generated hologram may be generated based on complex amplitude information A(x, y)T(x, y) obtained by multiplying the phase information A(x, y) for optically transforming the input image in logarithmic polar coordinate by the amplitude information T(x, y) so that the data of the hologram is stored by the memory 9. Then, in response to a signal outputted from the memory 9, the hologram is displayed on the second liquid crystal display 6, and complex amplitude information is generated by multiplying the complex amplitude information A(x, y)T(x, y) by the information f1(x, y) of the input image, and then, the complex amplitude information f1(x, y)A(x, y)T(x, y) thus generated is Fourier-transformed. Thus, a similar effect can be obtained.

Figure 2:
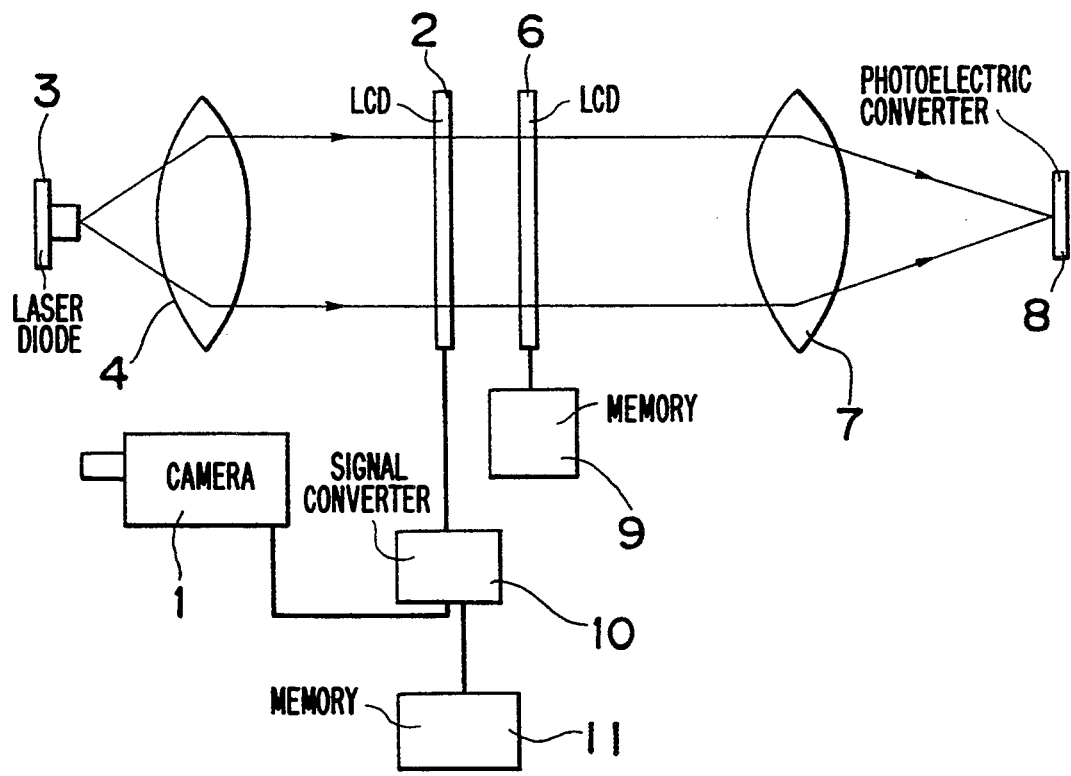
FIG. 2 is a fundamental construction view showing an optical information processing apparatus for performing a logarithmic polar coordinate transformation according to a second embodiment of the present invention.

FIG. 2 shows the fundamental construction of an optical information processing apparatus for carrying out the logarithmic polar coordinate transforming method according to a second embodiment of the present invention. In this embodiment, a second memory 11 in which amplitude information T(x, y) is recorded and a signal converting means 10 replace the amplitude filter 5 of the first embodiment of the present invention.

The operation of the optical information processing apparatus constructed as above is described. First, when an object is picked up by the TV camera 1, the signal converting means 10 electrically multiplies the information f1(x, y) of the object image by the amplitude information T(x, y) outputted from the second memory 11, thus generating information f1(x, y)T(x, y). Then, the information f1(x, y)T(x, y) is displayed on the first liquid crystal display 2. Then, the first liquid crystal display 2 is irradiated by coherent beams emitted by the laser diode 3 and made to be parallel with each other by the collimator lens 4.

At this time, in response to as an input signal data stored in the memory 9, the transmission coefficient of each pixel of the second liquid crystal display 6 is spatially modulated and as a result, phase information A(x, y) for optically transforming the input image in logarithmic polar coordinate is displayed on the second liquid crystal display 6 in the form of a computer-generated hologram.

Accordingly, information f1(x, y)T(x, y) displayed on the first liquid crystal display 2 and the phase information A(x, y) are superimposed on each other thereon, and thus complex amplitude information f1(x, y)A(x, y)T(x, y) is obtained.

Since the second liquid crystal display 6 is disposed on the front focal plane of the lens 7, the complex amplitude information f1(x, y)A(x, y)T(x, y) is optically Fourier-transformed by the lens 7 and an image obtained by transforming the information f1(x, y) of the input object image in logarithmic polar coordinate is detected by the photoelectric converting device 8.

The optical information processing apparatus with the above-described construction according to the second embodiment has an effect similar to that of the first embodiment.

In these embodiments, the image sent from the TV camera 1 is used as it is, but needless to say, a similar effect can be obtained by using a transformed image such as an optically or electrically Fourier-transformed image.

Figure 3:
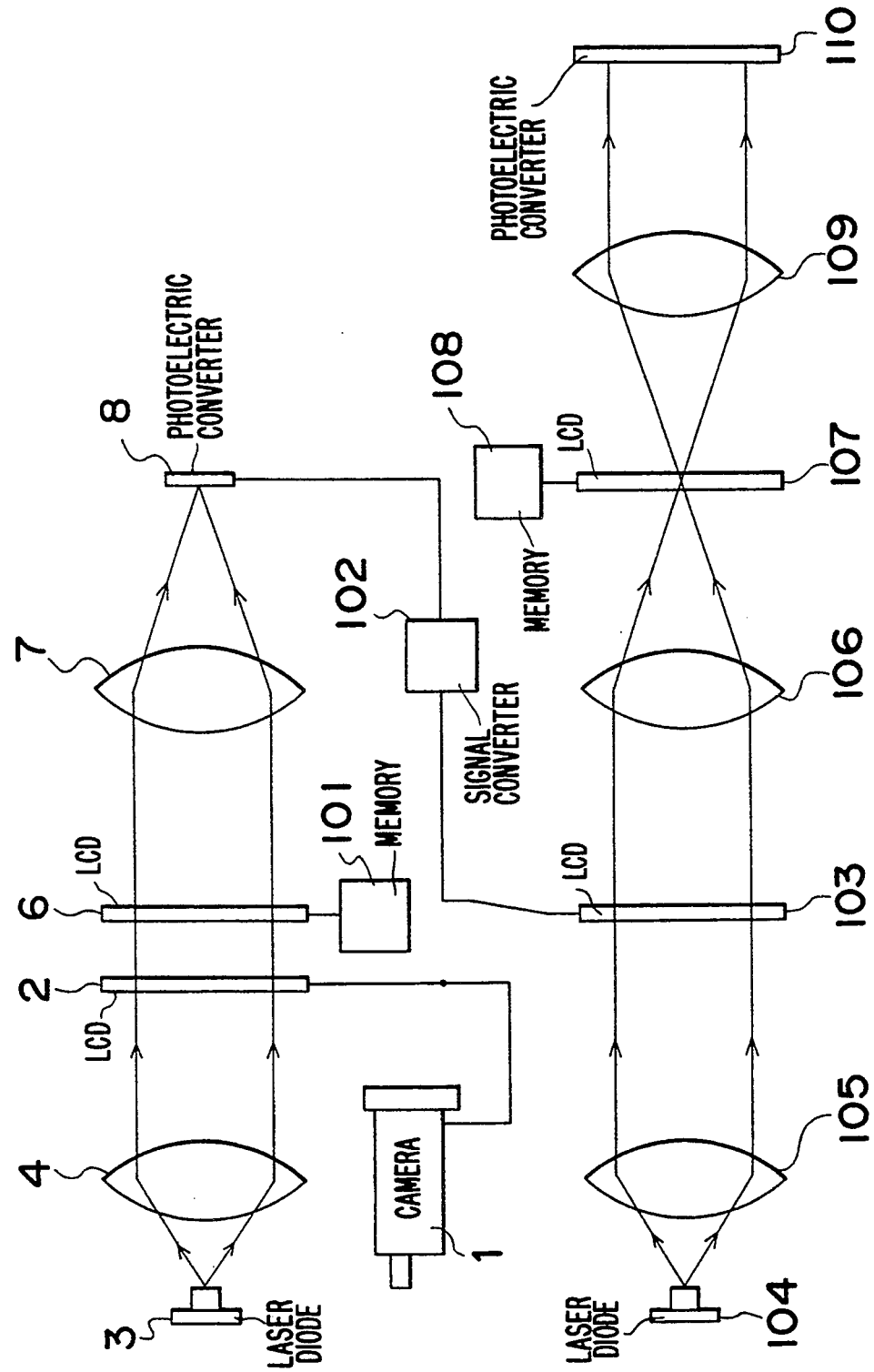
FIG. 3 is a fundamental construction view showing an optical information processing apparatus for performing a vision recognition according to a third embodiment of the present invention.

FIG. 3 shows the fundamental construction of an optical information processing apparatus for carrying out a vision recognizing method according to a third embodiment of the present invention. The same parts as those of the first and second embodiments are denoted by the same reference numerals and the descriptions thereof are omitted. The optical information processing apparatus according to the third embodiment comprises a first memory 101 for storing the data of a computer-generated hologram generated based on complex amplitude information A(x, y)T(x, y) prepared in advance by the computer, namely, the data of an applied voltage corresponding to the transmission coefficient of each pixel of the second liquid crystal display 6.

The method for producing complex amplitude information is described below. First, the complex amplitude information A(x y)T(x, y) is generated by multiplying the phase information A(x, y) for optically transforming the input image in the logarithmic polar coordinate by the amplitude information T(x, y). The method for generating the phase information and the amplitude information is the same as that of the first or second embodiment. The optical information processing apparatus further comprises a signal converting means 102 for converting an output signal of the photoelectric converting device 8 into a signal, for example, a non-interlace signal suitable for a liquid crystal display and inputting the converted signal to a third liquid crystal display 103 disposed on the front focal plane of a second lens 106; a second laser diode 104; a second collimator lens 105; the second lens 106; a fourth liquid crystal display 107 disposed at the rear focal plane of the second lens 106; a second memory 108 for storing the data of a computer-generated hologram generated based on complex amplitude information $M2^*(wc, wd)$ prepared in advance by the computer, namely, the data of an applied voltage corresponding to the transmission coefficient of each pixel of the fourth liquid crystal display 107.

The method for producing the complex amplitude information is described below. First, a reference image f2(x, y) is picked up by the TV camera 1 and inputted to the computer or generated by the computer. Second complex amplitude information f2(x, y)A(x, y)T(x, y) is generated by multiplying the information of the reference image f2(x, y) by the product of the phase information A(x, y) for optically transforming the input image in logarithmic polar coordinate and the amplitude information T(x, y).

Then, using an FFT, the complex amplitude information is Fourier-transformed by the computer to generate an image C2(wa, wb) (corresponding to fourth complex amplitude information) by transforming the reference image in logarithmic polar coordinate. Then, the square $|C2(wa, wb)|^2$ of the value of the coordinate-transformed image C2(wa, wb) is Fourier-transformed again to generate sixth complex amplitude information M2(wc, wd). Then, information M2*(wc, wd) complexly conjugate to the sixth complex amplitude information M2(wc, wd) is generated.

The optical information processing apparatus further comprises a third lens 109, a second photoelectric converting device 110 disposed on the rear focal plane of the third lens 109, and the fourth liquid crystal display 107 disposed on the front focal plane of the third lens 109.

The operation of the optical information processing apparatus constructed as above is described. First, when an object is picked up by the TV camera 1, the image f1(x, y) is displayed on the first liquid crystal display 2.

The first liquid crystal display 2 is irradiated by coherent beams emitted by the laser diode 3 and made to be parallel with each other by the collimator lens 4.

At this time, complex amplitude information A(x, y)T(x, y) generated in advance by the computer is displayed on the second liquid crystal display 6 in the form of a computer-generated hologram.

Accordingly, the information of the input image f1(x, y) displayed on the first liquid crystal display 2 and the complex amplitude information A(x, y)T(x, y) are superimposed on each other on the second liquid crystal display 6, and thus first complex amplitude information f1(x, y)A(x, y)T(x, y) is obtained.

Since the second liquid crystal display 6 is disposed on the front focal plane of the lens 7, the complex amplitude information f1(x, y)A(x, y)T(x, y) is optically Fourier-transformed by the lens 7, and the intensity distribution $|C1(wa, wb)|^2$ of the image obtained by transforming the information of the input object image (corresponding to third complex amplitude information) in logarithmic polar coordinate is detected by the photoelectric converting device 8.

The intensity distribution $|C1(wa, wb)|^2$ of the coordinate-transformed image of the input object image is displayed on the third liquid crystal display 103 via the signal converting means 102.

The third liquid crystal display 103 is irradiated by coherent beams emitted by the second laser diode 104 and made to be parallel with each other by the second collimator lens 105, and the square $|C1(wa, wb)|^2$ of the value of the third complex amplitude information (corresponding to coordinate-transformed image of input image) is optically Fourier-transformed by the second lens 106, and as a result, fifth complex amplitude information M1(wc, wd) is generated on the fourth liquid crystal display 107.

At this time, information M2*(wc, wd) complexly conjugate to sixth complex amplitude information M2(wc, wd) generated in advance by the computer is displayed on the fourth liquid crystal display 107. Thus, the information M2*(wc, wd) complexly conjugate to the sixth complex amplitude information M2(wc, wd) and the fifth complex amplitude information M1(wc, wd) are superimposed on each other on the fourth liquid crystal display 107, and thus seventh complex amplitude information M1(wc, wd)M2*(wc, wd) is obtained.

Since the fourth liquid crystal display 107 is disposed on the front focal plane of the third lens 109, the seventh complex amplitude information M1(wc, wd)M2*(wc, wd) on the fourth liquid crystal display 107 is optically Fourier-transformed by the third lens 109. Accordingly, as known as the correlation theorem of Fourier transformation, the square $|C1(wa, wb)|^2$ (intensity distribution of the image obtained by transforming the information of the input object image in logarithmic polar coordinate) of the value of the third complex amplitude information and the square $|C2(wa, wb)|^2$ (intensity distribution of the image obtained by transforming the reference image in logarithmic polar coordinate) of the value of the fourth complex amplitude information are optically correlatively calculated and the result of the calculation are detected by the photoelectric converting device 110.

Thus, the calculation regarding the correlation between the input image and the reference image is optically performed in the space of logarithmic polar coordinate.

As described above, according to the third embodiment, owing to the use of the amplitude information T(x, y), the amplitude of which changes depending on the distance between each point composing the amplitude information T(x, y) and the origin of logarithmic polar coordinate, a logarithmic polar coordinate transformation can be performed precisely without an intensity gradient being generated in the coordinate-transformed image in the radial direction thereof. Accordingly, pattern matching can be carried out with a high accuracy irrespective of the rotation of the object and the change of the magnification of the optical system.

In the third embodiment, the hologram generated on the basis of the information M2*(wc, wd) complexly conjugate to the sixth complex amplitude information M2(wc, wd) is displayed on the fourth liquid crystal display 107, but needless to say, it is possible to display a computer-generated hologram generated on the basis of the sixth complex amplitude information M2(wc, wd) and use a primary diffracted beam, namely, the information M2*(wc, wd) complexly conjugate to the sixth complex amplitude information M2(wc, wd).

Figure 4:
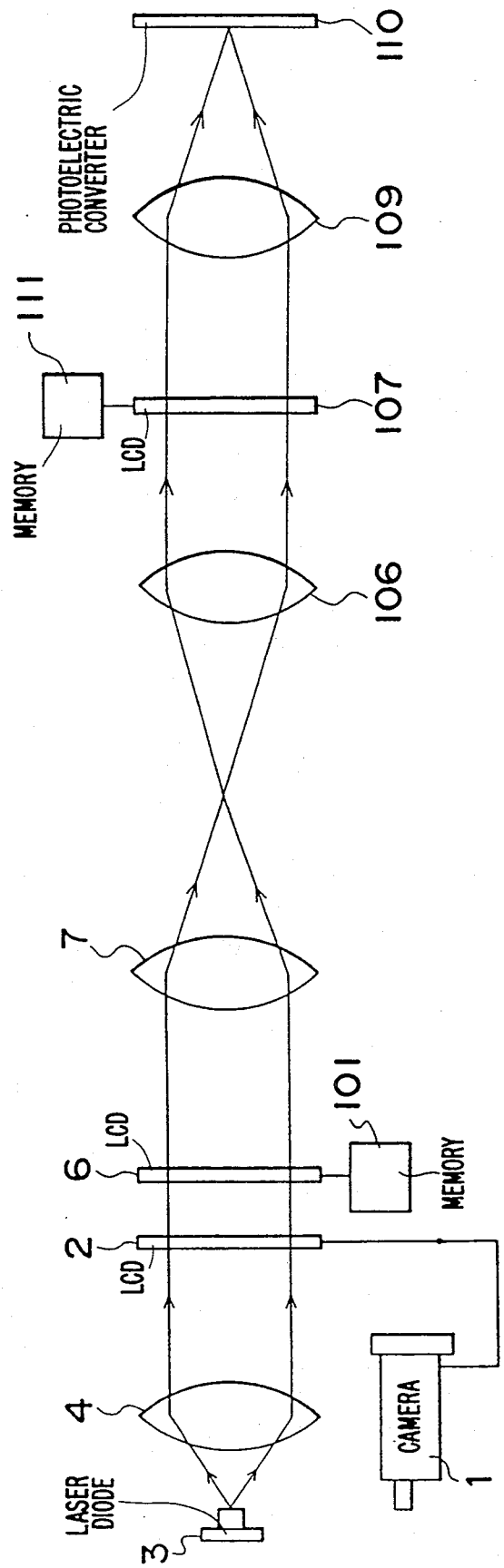
FIG. 4 is a fundamental construction view showing an optical information processing apparatus for performing a vision recognition according to a fourth embodiment of the present invention.

FIG. 4 shows the fundamental construction of an optical information processing apparatus for carrying out a vision recognizing method according to the fourth embodiment of the present invention. The same parts as those of the third embodiment are denoted by the same reference numerals and the descriptions thereof are omitted herein.

The optical information processing apparatus according to the fourth embodiment comprises a second memory 111 for storing the data of a computer-generated hologram generated based on the complex amplitude information M2*(wc, wd) generated in advance by the computer, namely, the data of an applied voltage corresponding to the transmission coefficient of each pixel of the fourth liquid crystal display 107.

The method for producing complex amplitude information is described below. First, a reference image f2(x, y) is inputted to the computer via the TV camera 1 or generated by the computer. Second complex amplitude information f2(x, y)A(x, y)T(x, y) is generated by multiplying the information of the reference image f2(x, y) by the product of the phase information A(x, y) for optically transforming the input image in the logarithmic polar coordinate and the amplitude information T(x, y).

Then, using an FFT, the complex amplitude information is Fourier-transformed by the computer to generate a coordinate-transformed image C2(wa, wb) (corresponding to fourth complex amplitude information) of the reference image. Then, the value |C2(wa, wb)| of the coordinate-transformed image C2(wa, wb) is Fourier-transformed again to generate sixth complex amplitude information M2(wc, wd). Then, information M2*(wc, wd) complexly conjugate to the sixth complex amplitude information M2(wc, wd) is generated.

The memory 108 of the third embodiment uses the square |C2(wa, wb)|$^2$ of the value of the coordinate-transformed image, whereas the memory 111 according to the fourth embodiment uses the value |C2(wa, wb)| of the coordinate-transformed image.

The second lens 106 is disposed on the rear focal plane of the first lens 7.

The operation of the optical information processing apparatus constructed as above is described. First, when an object is picked up by the TV camera 1, the image f1(x, y) is displayed on the first liquid crystal display 2.

The first liquid crystal display 2 is irradiated by coherent beams emitted by the laser diode 3 and made to be parallel with each other by the collimator lens 4.

At this time, the complex amplitude information A(x, y)T(x, y) previously generated by the computer is displayed on the second liquid crystal display 6 in the form of a computer-generated hologram.

Accordingly, the information of the input image f1(x, y) displayed on the first liquid crystal display 2 and the complex amplitude information A(x, y)T(x, y) are superimposed on each other on the second liquid crystal display 6, and thus first complex amplitude information f1(x, y)A(x, y)T(x, y) is obtained.

Since the second liquid crystal display 6 is disposed on the front focal plane of the first lens 7, the first complex amplitude information f1(x, y)A(x, y)T(x, y) is optically Fourier-transformed by the first lens 7, and the coordinate-transformed image C1(wa, wb) (corresponding to the third complex amplitude information) of the input image is formed on the rear focal plane of the first lens 7, namely, on the front focal plane of the second lens 106. The third complex amplitude information C1(wa, wb) (corresponding to the coordinate-transformed image of the input image) is optically Fourier-transformed by the second lens 106 and fifth complex amplitude information M1(wc, wd) is displayed on the fourth liquid crystal display 107.

At this time, information M2*(wc, wd), complexly conjugate to sixth complex amplitude information M2(wc, wd), previously generated by the computer is displayed on the fourth liquid crystal display 107. Thus, the information M2*(wc, wd) complexly conjugate to the sixth complex amplitude information M2(wc, wd) and the fifth complex amplitude information M1(wc, wd) are superimposed on each other on the fourth liquid crystal display 107 and thus seventh complex amplitude information M1(wc, wd)M2*(wc, wd) is obtained.

Since the fourth liquid crystal display 107 is disposed on the front focal plane of the third lens 109, the seventh complex amplitude information M1(wc, wd)M2*(wc, wd) displayed on the fourth liquid crystal display 107 is optically Fourier-transformed by the third lens 109. Accordingly, as known as the correlation theorem of Fourier transformation, a calculation of the correlation between the third complex amplitude information C1(wa, wb)(corresponding to the coordinate-transformed image of the input image) and the value |C2(wa, wb)| (corresponding to value of the coordinate-transformed image of the reference image) of the fourth complex amplitude information is optically performed, and the result of the calculation is detected by the photoelectric converting device 110.

Thus, the calculation regarding the correlation between the input image and the reference image is optically performed in the space of the logarithmic polar coordinate.

As described above, the fourth embodiment has an effect similar to that of the third embodiment.

The optical information processing apparatus has a simple construction, i.e., it does not include the first photoelectric converting device 8, the signal converting means 102, the third liquid crystal display 103, the second laser diode 104, and the second collimator lens 105. Therefore, the apparatus is capable of optically performing a series processing of the input image and thus recognizing a vision at a high speed.

Figure 5:
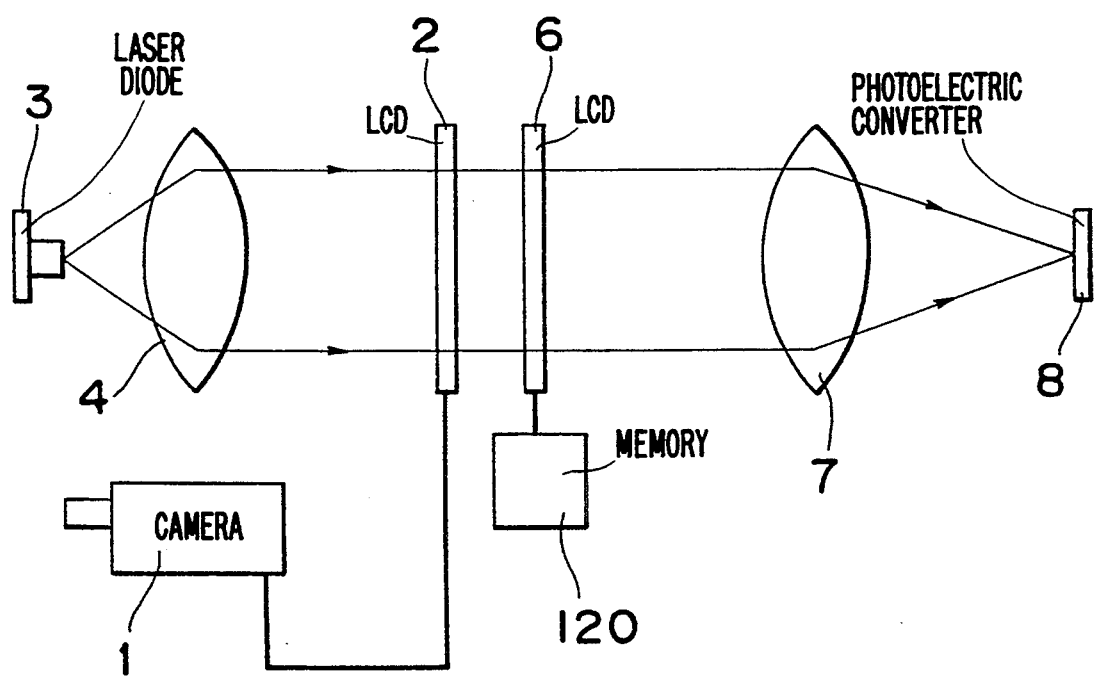
FIG. 5 is a fundamental construction view showing an optical information processing apparatus for performing a vision recognition according to a fifth embodiment of the present invention.

FIG. 5 shows the fundamental construction of the optical information processing apparatus for carrying out the vision recognizing method according to a fifth embodiment of the present invention. In FIG. 5, the same parts as those of the conventional art are denoted by the same reference numerals and the descriptions thereof are omitted herein. The fifth embodiment is different from the conventional art in that the apparatus of the fifth embodiment comprises a memory 120 for storing the data of a computer-generated hologram generated based on complex amplitude information M2*(−wc, −wd)A(x, y)T(x, y) generated in advance by the computer, namely, the data of an applied voltage corresponding to the transmission coefficient of each pixel of the second liquid crystal display 6.

The method for producing complex amplitude information is described below. First, a reference image f2(x, y) is picked up by the TV camera 1 and inputted to the computer or generated by the computer. First complex amplitude information f2(x, y)A(x, y)T(x, y) is generated by multiplying the information of the reference image f2(x, y) by the product of phase information A(x, y) = exp[$2\pi i/(f_L\lambda)$]{xln(x$^2$+y$^2$)$^{\frac{1}{2}}$−ytan$^{-1}$(y/x)-x}] for optically transforming the input image in logarithmic polar coordinate and amplitude information T(x, y). In the above equation, "$f_L$" is the focal length of the lens 7 and "$\lambda$" is the wavelength of the laser diode 3.

Then, using an FFT, the first complex amplitude information is Fourier-transformed by the computer to generate a coordinate-transformed image C2(wa, wb) (corresponding to second complex amplitude information) of the reference image. Then, the value |C2(wa, wb)| of the coordinate-transformed image C2(wa, wb) is Fourier-transformed again to generate third complex amplitude information M2(wc, wd). Then, fourth complex amplitude information M2*(−wc, −wd)A(x, y)T(x, y) is generated by multiplying the information of an inverted image M2*(−wc, −wd) complexly conjugate to the third complex amplitude information by the product of the phase information A(x, y) and the amplitude information T(x, y).

Figure 9:
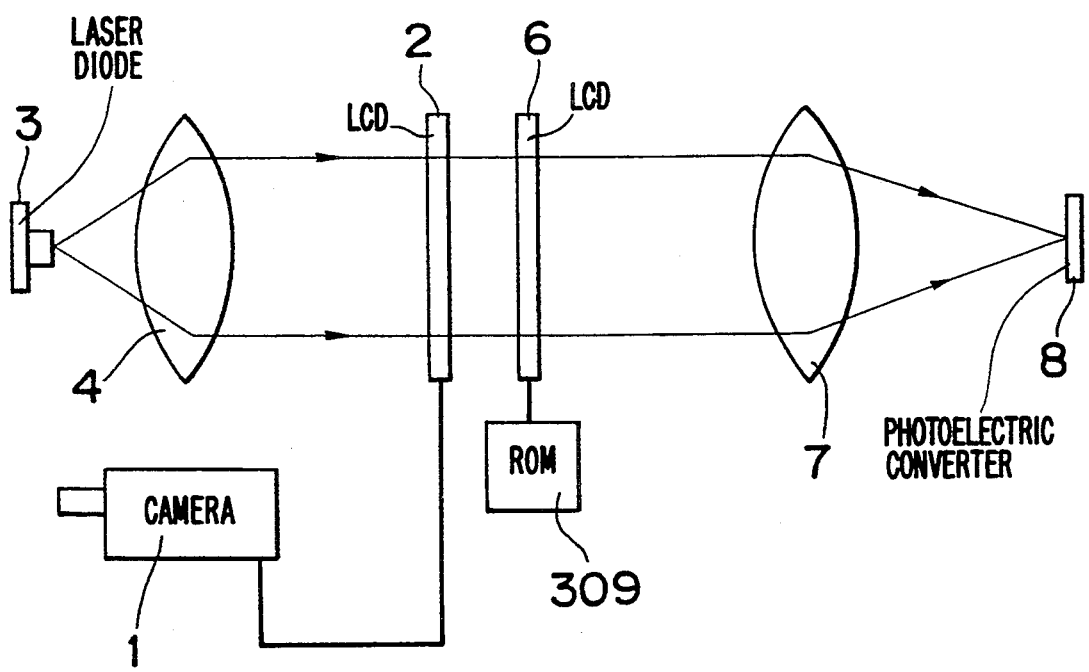
FIG. 9 is a fundamental construction view showing a conventional optical information processing apparatus.

The ROM 309 of the conventional apparatus shown in FIG. 9 stores the phase information A(x, y) for optically transforming the input image in logarithmic polar coordinate. That is, the ROM 309 has a function of transforming the input image in logarithmic polar coordinate, whereas the memory 120 of the fifth embodiment has the function of transforming the input image in logarithmic polar coordinate and in addition, serves as a matched filter, namely, has a function of performing a calculation of the correlation between the input image and the reference image.

The operation of the optical information processing apparatus constructed as above is described. First, when an object is picked up by the TV camera 1, the image f1(x, y) thereof is displayed on the first liquid crystal display 2.

Then, the first liquid crystal display 2 is irradiated by coherent beams emitted by the laser diode 3 and made to be parallel with each other by the collimator lens 4.

At this time, the fourth complex amplitude information M2*(−wc,−wd)A(x, y)T(x, y) generated in advance by the computer is displayed on the second liquid crystal display 6 in the form of a computer-generated hologram.

Accordingly, the information of the image f1(x, y) displayed on the first liquid crystal display 2 and the fourth complex amplitude information M2*(−wc, −wd)A(x, y)T(x, y) are superimposed on each other on the second liquid crystal display 6, and thus fifth complex amplitude information f1(x, y)A(x, y)T(x, y)M2*(−wc, −wd) is generated.

Since the second liquid crystal display 6 is disposed on the front focal plane of the lens 7, the fifth complex amplitude information f1(x, y)A(x, y)T(x, y)M2*(wc, wc, wd) is optically Fourier-transformed by the lens 7, and the result s(we, wf) is detected by the photoelectric converting device 8.

The result thus detected can be written as shown in equation (1) below.

$$s(we, wf) = FT[f1(x, y)A(x, y)T(x, y)M2^*(-wc, -wd)] \\ = FT[FT[FT-1[f1(x, y)A(x, y)T(x, y)]]FT[FT-1[M2(-wc, -wd)]]^*] \quad (1)$$

where "FT" is Fourier transformation; "FT-1" is an inverse Fourier transformation; and "*" is complex conjugate information. C1 (wa, wb) can be written as shown by equation (2).

$$C1(wa, wb) = FT[f1(x, y)A(x, y)T(x, y)] \quad (2)$$

Accordingly, the part FT−1[f1(x, y)A(x, y)T(x, y)] can be written as shown by an equation (3) shown below.

$$FT - 1[f1(x, y)A(x, y)T(x, y)] \quad (3) \\ = FT - 1[FT - 1[FT[f1(x, y)A(x, y)T(x, y)]]] \\ = FT - 1[FT - 1[C1(wa, wb)]] \\ = C1(-wa, -wb)$$

M2 (wc, wd) can be written as shown by an equation (4) shown below.

$$M2(wc, wd) = FT[|C2(wa, wb)|] \quad (4)$$

Accordingly, the part FT−1 [M2 (−wc, −wd)] can be written as shown by equation (5):

$$FT - 1[M2(-wc, -wd)] = FT - 1[M2(-wc, -wd)] \quad (5) \\ = |C2(-wa, -wb)|$$

Accordingly, equation (1) can be rewritten as shown in equation (6) from equations (3) and (5).

$$s(we, wf) = FT[FT[C1(-wa, -wb)]FT[|C2(-wa, -wc)|]^*] \quad (6)$$

Equation (6) shows, as known as the correlation theorem of Fourier transformation, the calculation regarding the correlation between the value of the inverted image C1(−wa, −wb) of the coordinate-transformed image of the input image f1(x, y) and the value |C2(−wa, −wb)| of the inverted image of the coordinate-transformed image of the reference imager f2(x, y). Thus, the calculation regarding the correlation between the input image and the reference image is optically performed in the space of logarithmic polar coordinate.

As described above, the fifth embodiment has an effect similar to that of the fourth embodiment.

According to the fifth embodiment, since the apparatus comprises the memory 120 storing much information, the apparatus has a simple construction and is capable of optically performing a series processing of the input image and thus recognizing a vision at a high speed.

It is possible to generate the data of a computer-generated hologram based on the complex amplitude information M2*(−wc, −wd)A(x, y) by using the apparatus as shown in FIGS. 1 and 2, generate the data of an applied voltage corresponding to the transmission coefficient of each pixel of the second liquid crystal display 6 based on the data of the computer-generated hologram, and write the data of the applied voltage onto the memory 9. Thus, the same effect as that of the fifth embodiment can be obtained.

Figure 6:
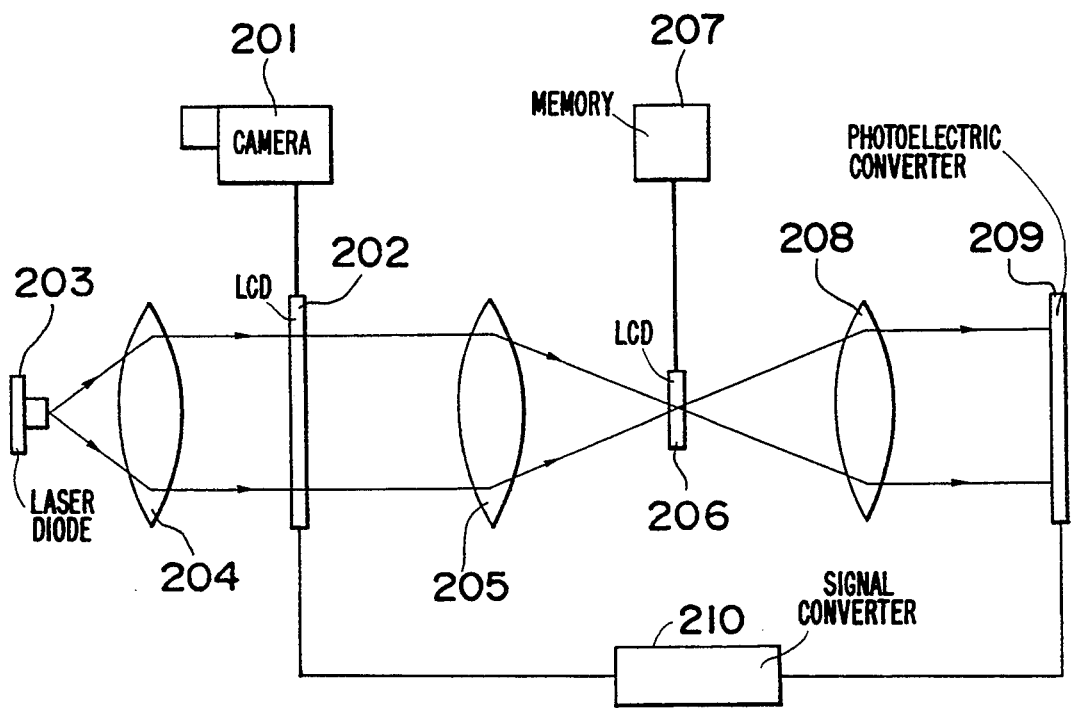
FIG. 6 is a fundamental construction view showing an optical information processing apparatus for performing a vision recognition according to a sixth embodiment of the present invention.

FIG. 6 shows the fundamental construction of an optical information processing apparatus according to a sixth embodiment of the present invention.

The optical information processing apparatus comprises a TV camera 201; a first liquid crystal display 202 which displays an image picked up by the TV camera 201; a laser diode 203; a collimator lens 204 which makes beams emitted by the laser diode 203 parallel with each other; a first lens 205; a second liquid crystal display 206 disposed on the rear focal plane of the first lens 205; and a memory 207. The first liquid crystal display 202 is disposed on the front focal plane of the first lens 205. The memory 207 stores the data of a computer-generated hologram generated based on complex amplitude information A(wx, wy)T(wx, wy) and the complex amplitude information M2*(wc, wd) generated in advance by the computer, namely, the data of an applied voltage corresponding to the transmission coefficient of each pixel of the second liquid crystal display 206.

The method for producing complex amplitude information is described below. First, the method for generating the complex amplitude information A(wx, wy)T(wx, wy) is described below. The complex amplitude information $A(w_x, w_y)T(w_x, w_y)$ is generated by multiplying the phase information $A(w_x, w_y)$ for optically transforming the input image in logarithmic polar coordinate by the amplitude information $T(w_x, w_y)$. The method for generating the phase information and the amplitude information is the same as that of the first or second embodiment.

The method for generating the complex amplitude information $M2^*(w_c, w_d)$ is described below. A reference image $f2(x, y)$ is picked up by the TV camera 1 and inputted to the computer or generated by the computer. Then, using an FFT, the complex amplitude information is Fourier-transformed by the computer to generate second complex amplitude information $F2(w_x, w_y)$. Then, the second complex amplitude information $F2(w_x, w_y)$ is multiplied by the product of the phase information $A(w_x, w_y)$ and the amplitude information $T(w_x, w_y)$ to generate fourth complex amplitude information $F2(w_x, w_y)A(w_x, w_y)T(w_x, w_y)$. Then, sixth complex amplitude information $C2(w_a, w_b)$ is generated by performing a Fourier-transformation thereof again. Thereafter, the square $|C2(w_a, w_b)|^2$ of the value of the sixth complex amplitude information $C2(w_a, w_b)$ is Fourier-transformed again to generate eighth complex amplitude information $M2(w_c, w_d)$. Finally, information $M2(w_c, w_d)^*$ complexly conjugate to the eighth complex amplitude information $M2(w_c, w_d)$ is generated.

The optical information processing apparatus further comprises a second lens 208; a second liquid crystal display 206 disposed on the front focal plane of the second lens 208; a photoelectric converting device 209 disposed on the rear focal plane of the second lens 208; a signal converting means 210 for converting an output signal of the photoelectric converting device 209 into a signal, for example, a non-interlace signal suitable for the liquid crystal display 202 and inputting the converted signal to the first liquid crystal display 202.

The operation of the optical information processing apparatus constructed as above according to the sixth embodiment is described below.

First, when an object is picked up by the TV camera 201, the image $f1(x, y)$ thereof is displayed on the first liquid crystal display 202.

The first liquid crystal display 202 is irradiated by coherent beams emitted by the laser diode 203 and made to be parallel with each other by the collimator lens 204. Since the first liquid crystal display 202 is disposed on the front focal plane of the first lens 205, a Fourier-transformed image $F1(w_x, w_y)$ (corresponding to the first complex amplitude information) of the object optically performed by the first lens 205 is formed on the rear focal plane of the first lens 205, namely, on the second liquid crystal display 206.

At this time, in response to as an input signal data written onto the memory 207, the transmission coefficient of each pixel of the second liquid crystal display 206 is spatially modulated and as a result, the complex amplitude information $A(w_x, w_y)T(w_x, w_y)$ is displayed on the second liquid crystal display 206 in the form of a computer-generated hologram.

Accordingly, the Fourier-transformed image information $F1(w_x, w_y)$ of the object displayed on the first liquid crystal display 202, the phase information $A(w_x, w_y)$, and the amplitude information $T(w_x, w_y)$ are superimposed on each other on the second liquid crystal display 206, and thus third complex amplitude information $F1(w_x, w_y)A(w_x, w_y)T(w_x, w_y)$ is obtained.

Since the second liquid crystal display 206 is disposed on the front focal plane of the second lens 208, the third complex amplitude information $F1(w_x, w_y)A(w_x, w_y)T(w_x, w_y)$ is optically Fourier-transformed by the second lens 208, and the intensity distribution $|C1(w_a, w_b)|^2$ of the coordinate-transformed image $C1(w_a, w_b)$ (corresponding to the fifth complex amplitude information) of Fourier-transformed image $F1(w_x, w_y)$ is detected by the photoelectric converting device 209 disposed on the rear focal plane of the second lens 208. The intensity distribution $|C1(w_a, w_b)|^2$ is displayed on the first liquid crystal display 202 via the signal converting means 201.

The first liquid crystal display 202 is irradiated by coherent beams, and the square $|C1(w_a, w_b)|^2$ of the value of the fifth complex amplitude information is optically Fourier-transformed by the first lens 205, and seventh complex amplitude information $M1(w_c, w_d)$ is generated on the second liquid crystal display 206.

At this time, information $M2^*(w_c, w_d)$ complexly conjugate to eighth complex amplitude information $M2(w_c, w_d)$ previously generated by the computer is displayed on the second liquid crystal display 206.

Thus, the seventh complex amplitude information $M1(w_c, w_d)$ and the information $M2^*(w_c, w_d)$ complexly conjugate to the eighth complex amplitude information $M2(w_c, w_d)$ are superimposed on each other on the second liquid crystal display 206, and thus ninth complex amplitude information $M1(w_c, w_d)M2^*(w_c, w_d)$ is generated.

The ninth complex amplitude information $M1(w_c, w_d)M2^*(w_c, w_d)$ displayed on the second liquid crystal display 206 is optically Fourier-transformed by the second lens 208. Accordingly, as known as the correlation theorem of Fourier transformation, the square $|C1(w_a, w_b)|^2$ of the value of the fifth complex amplitude information and the square $|C2(w_a, w_b)|^2$ of the value of the sixth complex amplitude information are optically correlatively calculated, and the result of the calculation is detected by the photoelectric converting device 209.

As described above, according to the sixth embodiment, owing to the use of the amplitude information $T(w_x, w_y)$, the amplitude of which changes depending on the distance between each point composing the amplitude information $T(x, y)$ and the origin of logarithmic polar coordinate, a logarithmic polar coordinate transformation can be performed precisely without an intensity gradient being generated in the coordinate-transformed image in the radial direction thereof. Accordingly, pattern matching can be carried out accurately without a change in the position and rotation of the object and the magnification of the optical system.

In the sixth embodiment, the hologram generated on the basis of the information $M2^*(w_c, w_d)$ complexly conjugate to the eighth complex amplitude information $M2(WC, w_d)$ is displayed on the second liquid crystal display 206, but needless to say, it is possible to display a hologram generated on the basis of the eighth complex amplitude information $M2(w_c, w_d)$ and use a primary diffracted beam, namely, the information $M2^*(w_c, w_d)$ complexly conjugate to the eighth complex amplitude information $M2(w_c, w_d)$.

Figure 7:
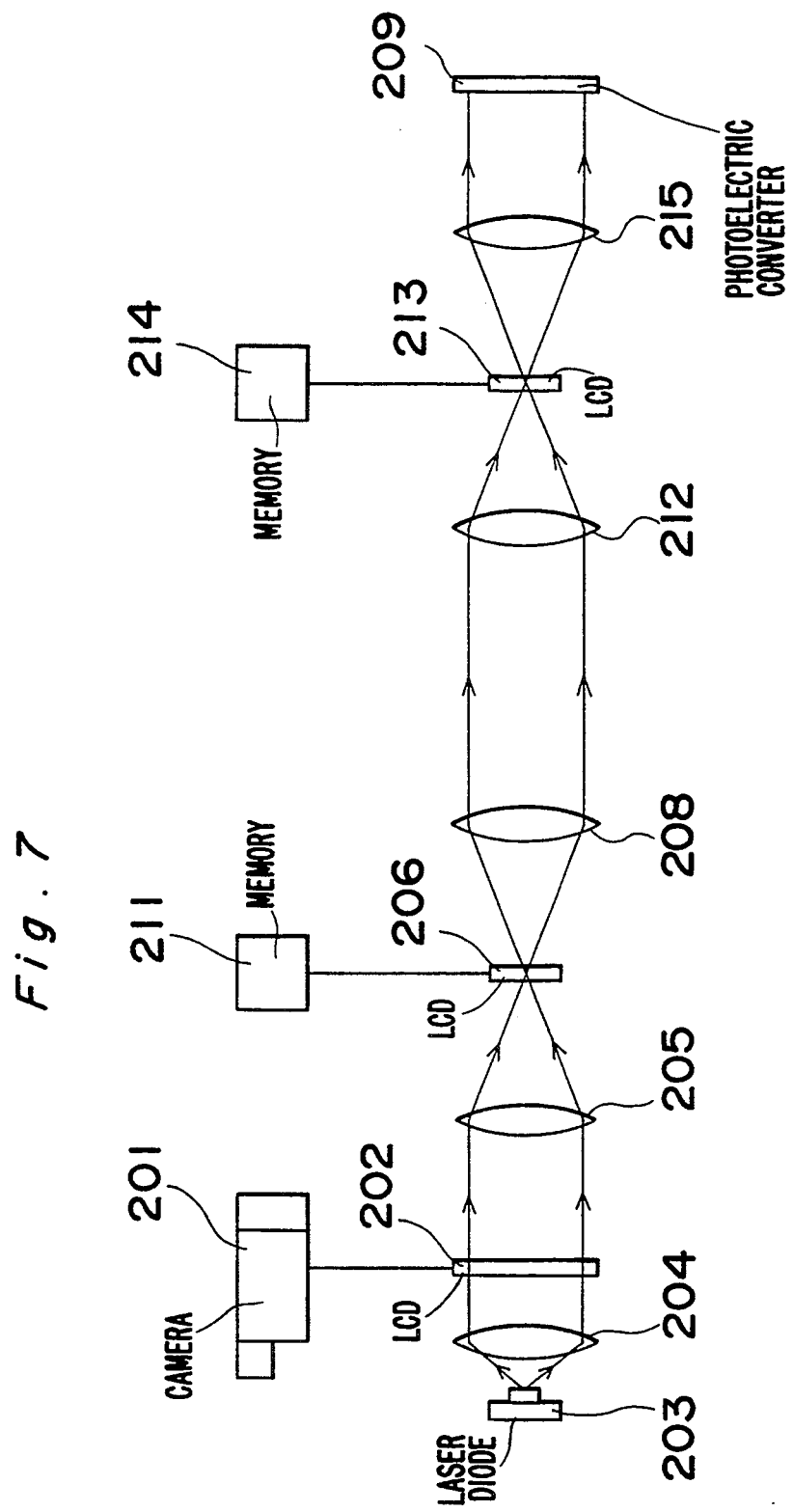
FIG. 7 is a fundamental construction view showing an optical information processing apparatus for performing a vision recognition according to a seventh embodiment of the present invention.

FIG. 7 shows the fundamental construction of an optical information processing apparatus according to a seventh embodiment of the present invention.

The same parts as those of the sixth embodiment are denoted by the same reference numerals and the descriptions thereof are omitted herein. The optical information processing apparatus comprises a first memory 211 for storing the data of a computer-generated hologram generated based on complex amplitude information $A(wx, wy)T(wx, wy)$ generated in advance by the computer, namely, the data of an applied voltage corresponding to the transmission coefficient of each pixel of the second liquid crystal display 206; a third lens 212 disposed so that the rear focal plane of the second lens 208 coincides with the front focal plane of the third lens 212; a third liquid crystal display 213 disposed on the rear focal plane of the third lens 212; and a second memory 214 for storing the data of a computer-generated hologram generated based on complex amplitude information $M2^*(wc, wd)$ generated in advance by the computer, namely, the data of an applied voltage corresponding to the transmission coefficient of each pixel of the third liquid crystal display 213.

The method for producing complex amplitude information is described below. First, a reference image $f2(x, y)$ is picked up by the TV camera and inputted to the computer or generated by the computer. Then, using the FFT, the information of the reference image $f2(x, y)$ is 0 Fourier-transformed by the computer to generate second complex amplitude information $F2(wx, wy)$. Then, the phase information $A(wx, wy)$ is multiplied by the product of the amplitude information $T(wx, wy)$ and the second complex amplitude information $F2(wx, wy)$ to generate fourth complex amplitude information $F2(wx, wy)A(wx, wy)T(wx, wy)$. Thereafter, sixth complex amplitude information $C2(wa, wb)$ is generated by performing a Fourier transformation thereof again. Thereafter, the value $|C2(wa, wb)|$ of the sixth complex amplitude information is Fourier-transformed again to generate eighth complex amplitude information $M2(wc, wd)$. Finally, information $M2(wc, wd)^*$ complexly conjugate to the eighth complex amplitude information $M2(wc, wd)$ is generated.

The optical information processing apparatus further comprises a fourth lens 215. The second liquid crystal display 206 is disposed on the front focal plane of the fourth lens 215. The photoelectric converting device 209 is disposed on the rear focal plane of the fourth lens 215.

The operation of the optical information processing apparatus constructed as above according to the seventh embodiment is described below.

First, when an object is picked up by the TV camera 201, the image $f1(x, y)$ thereof is displayed on the first liquid crystal display 202.

The first liquid crystal display 202 is irradiated by coherent beams emitted by the laser diode 203 and made to be parallel with each other by the collimator lens 204. Since the first liquid crystal display 202 is disposed on the front focal plane of the first lens 205, a Fourier-transformed image $F1(wx, wy)$ (corresponding to the first complex amplitude information) of the object is formed on the rear focal plane of the first lens 205, namely, on the second liquid crystal display 206.

At this time, in response to as an input signal data written onto the memory 211, the transmission coefficient of each pixel of the second liquid crystal display 206 is spatially modulated and as a result, the complex amplitude information $A(wx, wy)T(wx, wy)$ is displayed on the second liquid crystal display 206 in the form of a computer-generated hologram.

Accordingly, the information of the Fourier-transformed image $F1(wx, wy)$ displayed on the first liquid crystal display 202, the phase information $A(wx, wy)$, and the amplitude information $T(wx, wy)$ are superimposed on each other on the second liquid crystal display 206, and thus third complex amplitude information $F1(wx, wy)A(wx, wy)T(wx, wy)$ is generated.

Since the second liquid crystal display 206 is disposed on the front focal plane of the second lens 208, the third complex amplitude information $F1(wx, wy)A(wx, wy)T(wx, wy)$ is optically Fourier-transformed by the second lens 208, and the coordinate-transformed image $C1(wa, wb)$ (corresponding to the fifth complex amplitude information) of Fourier-transformed image $F1(wx, wy)$ is generated on the rear focal plane of the second lens 208, namely, the front focal plane of the third lens 212. The fifth complex amplitude information $C1(wa, wb)$ is Fourier-transformed by the third lens 212, and seventh complex amplitude information $M1(wc, wd)$ is generated on the third liquid crystal display 213.

At this time, in response to as an input signal data stored in the memory 214, the transmission coefficient of each pixel of the third liquid crystal display 213 is spatially modulated and as a result, information $M2^*(wc, wd)$ complexly conjugate to the eighth complex amplitude information $M2(wc, wd)$ generated in advance by the computer is displayed on the third liquid crystal display 213 in the form of a computer-generated hologram.

Accordingly, the seventh complex amplitude information $M1(wc, wd)$ and the information $M2^*(wc, wd)$ complexly conjugate to the eighth complex amplitude information $M2(wc, wd)$ are superimposed on each other on the third liquid crystal display 213, and thus ninth complex amplitude information $M1(wc, wd)M2^*(wc, wd)$ is generated.

The ninth complex amplitude information $M1(wc, wd)M2^*(wc, wd)$ displayed on the third liquid crystal display 213 is optically Fourier-transformed by the fourth lens 215. Accordingly, as known as the correlation theorem of Fourier transformation, the calculation regarding the correlation between the fifth complex amplitude information $C1(wa, wb)$ and the value $|C2(wa, wb)|$ of the sixth complex amplitude information are optically correlatively calculated, and the result of the calculation is detected by the photoelectric converting device 209.

As described above, the seventh embodiment has a similar effect to that of the sixth embodiment.

In addition, the apparatus is capable of optically performing a series processing of the input image and thus recognizing a vision at a high speed.

Figure 8:
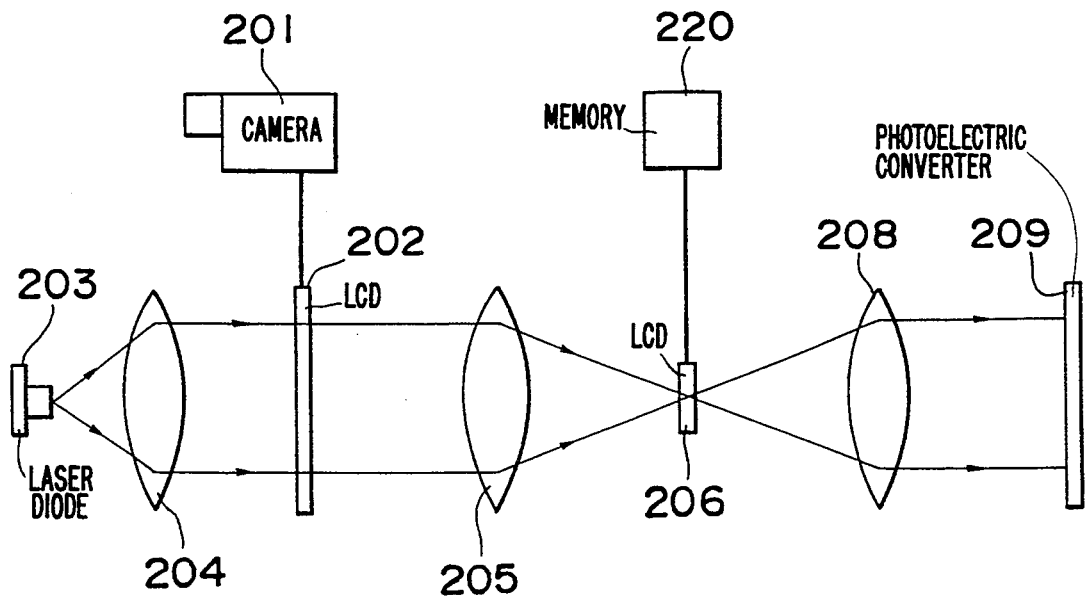
FIG. 8 is a fundamental construction view showing an optical information processing apparatus for performing a vision recognition according to an eighth embodiment of the present invention.

FIG. 8 shows the fundamental construction of an optical information processing apparatus according to an eighth embodiment of the present invention. The same parts as those of the seventh embodiment are denoted by the same reference numerals and the descriptions thereof are omitted herein. The optical information processing apparatus according to the eighth embodiment is different from that of the seventh embodiment in that the former has a memory 220 for storing the data of a computer-generated hologram generated based on sixth complex amplitude information $M2^*(-wc, -wd)A(x, y)T(x, y)$ generated in advance by the computer, namely, the data of an applied voltage corresponding to the transmission coefficient of each pixel of the second liquid crystal display 206.

The method for producing the sixth complex is amplitude information described below. First, a reference image $f2(x, y)$ is picked up by the TV camera and inputted to the computer or generated by the computer. Then, using the FFT, the information of the reference image f2(x, y) is Fourier-transformed by the computer to generate second complex amplitude information F2(wx, wy). Then, phase information A(wx, wy) for optically transforming the input image in logarithmic polar coordinate is multiplied by the product of amplitude information T(wx, wy) and second complex amplitude information F2(wx, wy) to generate third complex amplitude information F2(wx, wy)A(wx, wy)T(wx, wy). Then, fourth complex amplitude information C2(wa, wb) is generated by performing Fourier transformation thereof again. The method for generating the phase information and the amplitude information is similar to that of the first or second embodiment.

Thereafter, the value |C2(wa, wb)| of the fourth complex amplitude information is Fourier-transformed to generate fifth complex amplitude information M2(wc, wd). The information of an inverted image $M2^*(-wc, -wd)$ complexly conjugate to the fifth complex amplitude information M2(wc, wd) is multiplied by the product of the phase information A(wx, wy) and the amplitude information T(wx, wy) to generate sixth complex amplitude information $M2^*(-wc, -wd)A(wx, wy)T(wx, wy)$.

The operation of the optical information processing apparatus constructed as above according to the eighth embodiment is described below.

First, when an object is picked up by the TV camera 201, the image f1(x, y) thereof is displayed on the first liquid crystal display 202.

The first liquid crystal display 202 is irradiated by coherent beams emitted by the laser diode 203 and made to be parallel with each other by the collimator lens 204. Since the first liquid crystal display 202 is disposed on the front focal plane of the first lens 205, a Fourier-transformed image F1(wx, wy) (corresponding to the first complex amplitude information) of the object is formed on the rear focal plane of the first lens 205, namely, on the second liquid crystal display 206.

At this time, sixth complex amplitude information $M2^*(-wc, -wd)A(wx, wy)T(wx, wy)$ generated in advance by the computer and stored in the memory 220 is displayed on the second liquid crystal display 206. Thus, the sixth complex amplitude information $M2^*(-wc, -wd)A(wx, wy)T(wx, wy)$ and the first complex amplitude information F1(wx, wy) are superimposed on each other on the second liquid crystal display 206, and thus seventh complex amplitude information $F1(wx, wy)A(wx, wy)T(wx, wy)M2^*(-wc, -wd)$ is generated.

Since the second liquid crystal display 206 is disposed on the front focal plane of the second lens 208, the seventh complex amplitude information $F1(wx, wy)A(wx, wy)T(wx, wy)M2^*(-wc, -wd)$ is optically Fourier-transformed by the second lens 208. The result s(we, wf) is detected by the photoelectric converting device 209 disposed on the rear focal plane of the second lens 208.

The result thus detected can be written as shown by an equation (7) below.

$$\begin{aligned} s(we, wf) &= FT[F1(wx, wy)A(wx, wy)T(wx, wy)M2^*(-wc, -wd)] \\ &= FT[FT[FT - \\ & 1[F1(wx, wy)A(wx, wy)T(wx, wy)]]FT[FT - \\ & 1[M2(-wc, -wd)]]^*] \end{aligned} \quad (7)$$

In the above equation (7), "FT" is Fourier transformation; "FT-1" is an inverse Fourier transformation; and "*" is complex conjugate information. C1(wa, wb) can be written as shown by an equation (8) below.

$$C1(wa, wb) = FT[F1(wx, wy)A(wx, wy)T(wx, wy)] \quad (8)$$

Accordingly, the part FT-1[F1(wx, wy)A(wx, wy)T(wx, wy)] can be rewritten as shown by an equation (9) below.

$$\begin{aligned} FT &- 1[F1(wx, wy)A(wx, wy)T(wx, wy)] \\ &= FT - 1[FT - 1[FT[F1(wx, wy)A(wx, wy)T(wx, wy)]]] \\ &= FT - 1[FT - 1[C1(wa, wb)]] \\ &= C1(-wa, -wb) \end{aligned} \quad (9)$$

M22(wc, wd) can be written as shown by an equation (10) below.

$$M2(wc, wd) = FT[|C2(wa, wb)|] \quad (10)$$

Accordingly, the part FT-1[M2(−wc, −wd)] can be rewritten as shown by an equation (11) below:

$$\begin{aligned} FT - 1[M2(-wc, -wd)] &= FT - 1[M2(-wc, -wb)] \\ &= |C2(-wa, -wb)| \end{aligned} \quad (11)$$

Accordingly, the equation (7) can be rewritten as shown by an equation (12) below from the equations (9) and (11).

$$s(we, wf) = FT[FT[C1(-wa, -wb)]FT[|C2(-wa, -wc)|]^*] \quad (12)$$

As well known as the correlative theorem of Fourier transformation, the equation (12) shows a calculation regarding the correlation between the information of an inverted image C1(−wa, −wb) of the coordinate-transformed image of the Fourier-transformed image F1(wx, wy) (of the input image f1(x, y)) and the value |C2(−wa, −wb)| of an inverted image of the coordinate-transformed image of the Fourier-transformed image F2(wx, wy) of the reference image f2(x, y). Thus, the calculation regarding the correlation between the input image and the reference image is optically performed in the space of logarithmic polar coordinate.

As described above, according to the eighth embodiment, owing to the use of the amplitude information T(x, y), the amplitude of which changes depending on the distance between each point composing the amplitude information T(x, y) and the origin of logarithmic polar coordinate, a logarithmic polar coordinate transformation can be performed precisely without an intensity gradient of coordinate-transformed image being generated in the radial direction thereof. Accordingly, pattern matching can be carried out accurately without a change in the position and rotation of the object and the magnification of the optical system.

According to the eighth embodiment, the apparatus has a simple construction and is capable of optically performing a series of processing of the input image and thus recognizing a vision at a high speed.

It is possible to generate the data of a computer-generated hologram based on the complex amplitude information $M2^*(-wc, -wd)A(x, y)$ by providing an amplitude filter similar to that of FIG. 1 on the light source side of the second liquid crystal display 206, generate the data of an applied voltage corresponding to the transmission coefficient of each pixel of the second liquid crystal display 206 based on the data of the computer-generated hologram, and write the data onto the memory 9. Thus, the same effect as that of the eighth embodiment can be obtained.

In the first through eighth embodiments, the liquid crystal displays of electrical-writing type are used in the embodiments as the first and second spatial optical-modulating element, but it is possible to use a spatial optical-modulating element consisting of optical crystal such as liquid crystal device or BSO of optical-writing type.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A logarithmic polar coordinate transforming method comprising the steps of:

picking up an image of an object using an image pick-up device and storing the picked-up image $f1(x, y)$ as an input image;

optically generating as an amplitude and phase information of coherent light complex amplitude information $f1(x, y)A(x, y)T(x, y)$ by multiplying the input image by a product of phase information $A(x, y)$ for performing a logarithmic polar coordinate transformation and amplitude information $T(x, y)$, an amplitude of which changes according to distance between each point composing the amplitude information $T(x, y)$ and origin or logarithmic polar coordinate to correct uneven intensity distribution generated in the logarithmic polar coordinate transformation using the phase information $A(x, y)$;

optically Fourier-transforming the complex amplitude information $f1(x, y)A(x, y)T(x, y)$ using a Fourier-transforming optical system; and picking up a Fourier-transformed image using an image pick-up device.

2. A vision recognizing method comprising the steps of:

picking up an image of an object using an image pick-up device and storing the picked-up image $f1(x, y)$ as an input image;

generating a reference image $f2(x, y)$ through one of an operation for picking up an image of a reference object and an operation for calculating the reference image;

optically generating as an amplitude and phase information of coherent light first complex amplitude information $f1(x, y)A(x, y)T(x, y)$ by multiplying the input image by a product of phase information $A(x, y)$ for performing a logarithmic polar coordinate transformation and amplitude information $T(x, y)$, an amplitude of which changes according to distance between each point composing the amplitude information $T(x, y)$ and origin of logarithmic polar coordinate;

generating second complex amplitude information $f2(x, y)A(x, y)T(x, y)$ by multiplying the reference image by a product of the phase information $A(x, y)$ and the amplitude information $T(x, y)$ through calculation;

optically generating third complex amplitude information $C1(wa, wb)$ by Fourier-transforming the first complex amplitude information using a Fourier-transforming optical system;

generating fourth complex amplitude information $C2(wa, wb)$ by Fourier-transforming the second complex amplitude information through calculation;

optically generating fifth complex amplitude information $M1(wc, wd)$ by Fourier-transforming one of the third complex amplitude information $C1(wa, wb)$ and intensity distribution obtained from the third complex amplitude information $C1(wa, wb)$ using the Fourier-transforming optical system;

generating sixth complex amplitude information $M2(wc, wd)$ by Fourier-transforming one of a value $|C2(wa, wb)|$ of the fourth complex amplitude information and a square $|C2(wa, wb)|^2$ thereof through calculation;

generating information $M2^*(wc, wd)$ complexly conjugate to the sixth complex amplitude information through calculation and displaying the information $M2^*(wc, wd)$ using a display device;

optically generating seventh complex amplitude information $M1(wc, wd)M2^*(wc, wd)$ by multiplying the fifth complex amplitude information $M1(wc, wd)$ by the information $M2^*(wc, wd)$ complexly conjugate to the sixth complex amplitude information;

optically Fourier-transforming the seventh complex amplitude information using the Fourier-transforming optical system; and picking up a Fourier-transformed image of the seventh complex amplitude information using an image pick-up device.

3. A vision recognizing method comprising the steps of:

picking up an image of an object using an image pick-up device and storing the picked-up image $f1(x, y)$ as an input image;

generating a reference image $f2(x, y)$ through one of an operation for picking up an image of a reference object and an operation for calculating the reference image;

generating through calculation first complex amplitude information $f2(x, y)A(x, y)T(x, y)$ by multiplying the reference image by a product of phase information $A(x, y)$ for performing a logarithmic $T(x, y)$, an amplitude of which changes according to distance between each point composing the amplitude information and origin of logarithmic polar coordinate to correct uneven intensity distribution generated in the logarithmic polar coordinate transformation with the phase information $A(x, y)$ used;

generating second complex amplitude information $C2(wa, wb)$ by Fourier-transforming the first complex amplitude information through calculation;

generating third complex amplitude information $M2(wc, wd)$ by Fourier-transforming a value $|C2(wa, wb)|$ of the second complex amplitude information through calculation;

generating through calculation fourth complex amplitude information $M2^*(-wc, -wd)A(x, y)T(x, y)$ by multiplying an inverted image $M2^*(-wc, -wd)$ of information complexly conjugate to the third complex amplitude information by a product of the phase information $A(x, y)$ and the amplitude information $T(x, y)$;

optically generating as an amplitude and phase information of coherent light fifth complex amplitude information $M2^*(-wc, -wd)A(x, y)T(x, y)f1(x, y)$ by multiplying the input image $f1(x, y)$ by the fourth complex amplitude information; and optically Fourier-transforming the fifth complex amplitude information using a Fourier-transforming optical system; and picking up a Fourier-transformed image of the fifth complex amplitude information using an image pick-up device.

4. A vision recognizing method comprising the steps of:

picking up an image of an object using an image pick-up device, storing the picked-up image $f1(x, y)$ as an input image, displaying the stored image using a display device, and optically generating the input image as an amplitude and phase information of coherent light;

generating a reference image $f2(x, y)$ through one of an operation for picking up an image of a reference object and an operation for calculating the reference image;

optically generating first complex amplitude information $F1(wx, wy)$ by Fourier-transforming the input image using a Fourier-transforming optical system;

generating second complex amplitude information $F2(wx, wy)$ by Fourier-transforming the reference image through calculation;

optically generating third complex amplitude information $F1(wx, wy)A(wx, wy)T(wx, wy)$ by multiplying the first complex amplitude information by a product of phase information $A(x, y)$ for performing a logarithmic polar coordinate transformation and amplitude information $T(x, y)$, an amplitude of which changes according to the distance between each point composing the amplitude information $T(x, y)$ and origin of logarithmic polar coordinate to correct uneven intensity distribution generated in the logarithmic polar coordinate transformation using the phase information $A(x, y)$;

generating fourth complex amplitude information $F2(wx, wy)A(wx, wy)T(wx, wy)$ by multiplying the second complex amplitude information by a product of the phase information $A(wx, wy)$ and the amplitude information $T(wx, wy)$ through calculation;

optically generating fifth complex amplitude information $C1(wa, wb)$ by Fourier-transforming the third complex amplitude information using the Fourier-transforming optical system;

generating sixth complex amplitude information $C2(wa, wb)$ by Fourier-transforming the fourth complex amplitude information through calculation;

optically generating seventh complex amplitude information $M1(wc, wd)$ by Fourier-transforming one of the fifth complex amplitude information $C1(wa, wb)$ and the intensity distribution obtained from the fifth complex amplitude information $C1(wa, wb)$ using the Fourier-transforming optical system;

generating eight complex amplitude information $M2(wc, wd)$ by Fourier-transforming one of a value $|C2(wa, wb)|$ of the sixth complex amplitude information and a square $|C2(wa, wb)|^2$ thereof through calculation;

displaying information $M2^*(wc, wd)$ complexly conjugate to the eighth complex amplitude information on the display device;

optically generating ninth complex amplitude information $M1(wc, wd)M2^*(wc, wd)$ by multiplying the seventh complex amplitude information $M1(wc, wd)$ by an information $M2^*(wc, wd)$ complexly conjugate to the eighth complex amplitude information;

picking up a Fourier-transformed image of the ninth complex amplitude information by the image pick-up device.

5. A vision recognizing method comprising the steps of:

picking up an image of an object using an image pick-up device, storing the picked-up image $f1(x, y)$ as an input image, displaying the stored image using a display device, and optically generating the input image as an amplitude and phase information of coherent light;

generating a reference image $f2(x, y)$ through one of an operation for picking up an image of a reference object and an operation for calculating the reference image;

optically generating first complex amplitude information $F1(wx, wy)$ by Fourier-transforming the input image using a Fourier-transforming optical system;

generating second complex amplitude information $F2(wx, wy)$ by Fourier-transforming the reference image through calculation;

generating through calculation third complex amplitude information $F2(wx, wy)A(wx, wy)T(wx, wy)$ by multiplying the second complex amplitude information by a product of phase information $A(wx, wy)$ for performing a logarithmic $T(wx, wy)$, an amplitude of which changes according to distance between each point composing the amplitude information and origin of logarithmic polar coordinate to correct uneven intensity distribution generated in the logarithmic polar coordinate transformation with the phase information used;

generating fourth complex amplitude information $C2(wa, wb)$ by Fourier-transforming the third complex amplitude information through calculation;

generating fifth complex amplitude information $M2(wc, wd)$ by Fourier-transforming a value $|C2(wa, wb)|$ of the fourth complex amplitude information through calculation;

generating sixth complex amplitude information $M2^*(-wc, -wd)A(wx, wy)T(wx, wy)$ by multiplying an inverted image $M2^*(-wc, -wd)$ of information $M2^*(wc, wd)$ complexly conjugate to the fifth complex amplitude information by a product of the phase information $A(wx, wy)$ and the amplitude information $T(wx, wy)$ through calculation;

optically generating seventh complex amplitude information $M2^*(-wc, -wd)A(wx, wy)T(wx, wy)F1(wx, wy)$ by multiplying the first complex amplitude information $F1(wx, wy)$ by the sixth complex amplitude information;

optically Fourier-transforming the seventh complex amplitude information using a Fourier-transforming optical system; and picking up a Fourier-transformed image of the seventh complex amplitude information using an image pick-up device.

* * * * *